(12) United States Patent
Chen

(10) Patent No.: US 8,310,163 B2
(45) Date of Patent: Nov. 13, 2012

(54) MICROCONTROLLER-BASED LIGHTING CONTROL SYSTEM AND METHOD FOR LIGHTING CONTROL

(76) Inventor: Chia-Teh Chen, Taipei (TW)

( * ) Notice: Subject to any disclaimer, the term of this patent is extended or adjusted under 35 U.S.C. 154(b) by 213 days.

(21) Appl. No.: 12/861,940

(22) Filed: Aug. 24, 2010

(65) Prior Publication Data

US 2012/0049747 A1    Mar. 1, 2012

(51) Int. Cl.
    *H05B 37/02*    (2006.01)
(52) U.S. Cl. .................. 315/159; 315/209 R
(58) Field of Classification Search ............ None
    See application file for complete search history.

(56) References Cited

U.S. PATENT DOCUMENTS

| | | |
|---|---|---|
| 5,442,177 A | 8/1995 | Boulos et al. |
| 5,598,066 A | 1/1997 | Wiesemann et al. |
| 5,920,156 A * | 7/1999 | Carson et al. ............ 315/317 |
| 6,285,140 B1 * | 9/2001 | Ruxton ............ 315/312 |
| 6,759,822 B2 * | 7/2004 | Marusarz ............ 318/268 |

* cited by examiner

*Primary Examiner* — Shawki Ismail
*Assistant Examiner* — Crystal L Hammond
(74) *Attorney, Agent, or Firm* — Rosenberg, Klein & Lee

(57) ABSTRACT

A lighting control system employs a microcontroller to generate time-delay pulses that are synchronized with the AC power. The time-delay pulses control conduction period of a semi-conductor switching device for transmitting AC power to a lighting load. This lighting control system enables the lighting load performing two-level or multi-level illumination in a simple and power saving manner. While the conventional circuits use cumbersome passive resistor-capacitor scheme to generate required timing control, this lighting control system uses simple scheme based on a built-in oscillator in the microcontroller. This scheme provides high flexibility and accuracy to implement delay-time triggering. The system and method in the present invention may simultaneously be applicable to lighting loads of different impedance types, especially to incandescent lamp, fluorescent lamp, and AC light emitting diode.

19 Claims, 12 Drawing Sheets ic # MICROCONTROLLER-BASED LIGHTING CONTROL SYSTEM AND METHOD FOR LIGHTING CONTROL

BACKGROUND OF THE INVENTION

1. Field of the Invention

The present invention relates to a lighting control system using a microcontroller, and to a lighting control method thereof, in particular, to the lighting control system and method for transmitting various electric powers to a lighting load by the microcontroller.

2. Description of Related Art

Refer to FIG. 1, which shows a schematic diagram of a conventional lighting control system. This kind of lighting control system has a light-dimming circuit 2, which is used to control an AC power to deliver a specific value of electric power to a lighting load 1. The light-dimming circuit 2 further includes a semi-conductor switching device 20 and a phase triggering circuit 22. This switching device 20 may be a well-known bi-directional control switch. The phase triggering circuit 22 usually comprises a variable resistor and a capacitor to generate trigger signals with variant time differences. The trigger signals are used to control the turn-on period of the semi-conductor switching device 20 during positive and negative half-cycle of the AC power. Therefore, variant electric powers are transmitted to the lighting load 1.

However, since the conventional system of this art is limited by its fundamental design, the turn-on period of the bi-directional control switch (such as TRIAC) may not be substantially adjusted for transmitting a full power or a predetermined minimal power to the lighting load. Moreover, the structure using a variable resistor to control light intensity may not be easily coupled with other electronic circuits to implement more desirable functions.

For preventing the above-mentioned drawback due to passive electric components, the light-dimming circuit 2 shown in FIG. 1 adopts circuits composed of semi-conductor electronic devices, for example, in U.S. Pat. No. 5,442,177. Thus the bi-directional control switch may be fully turned off or turned on within each AC half-cycle. In one further conventional art, for example, in U.S. Pat. No. 5,598,066, the light-dimming circuit 2 comprises an AC zero-crossing-point detection circuit to generate trigger signals and bring the bi-directional control switch into conduction with at least two different turn-on periods. So that, an incandescent lamp or a halogens lamp connected to this bi-directional control switch may display 30% or 100% of full light intensity within an AC-cycle. Furthermore, the circuits used in the bi-directional control switch may be incorporated with the circuits of daylight detection and motion detection. The lighting load of the above design may thus automatically deliver 30% or 100% of full light intensity in accordance with environmental conditions for the purpose of saving electric power.

However, the above-mentioned two arts have complicated circuit assembly. These arts of lighting control are implemented by analog-digital hybrid circuits that adopt lots of discrete analog and digital integrated circuits. Therefore, they cause high manufacturing cost and even result in high electric power consumption. For example, the power consumption in a light dimming system according to U.S. Pat. No. 5,598,066 is measured around 30 W at standby state. This quantity of electric power loss is even larger than the electric power dissipated at a low brightness state of the lighting load. Therefore, this conventional art of light control system with analog-digital hybrid circuits is not in compliance with the purpose of electric power saving.

SUMMARY OF THE INVENTION

Provided is a lighting control system using a microcontroller and a lighting control method therefor in accordance with the present invention. In particular, the lighting control system uses the microcontroller of one-time programming (OTP) type to construct circuit for transmitting predetermined AC electric power to the lighting load. The OTP microcontroller is manufactured by semi-conductor CMOS technology. This type of semi-conductor device offers great flexibility to implement a variety of circuit functions and has very low power consumption, probably smaller than 0.1 W. From the view point of circuit assembly and power-saving, the microcontroller-based circuit surpasses the conventional analog-digital hybrid circuits. Thus, the lighting control system in accordance with the present invention may achieve desirable power saving and greatly simplify the circuit assembly, as well.

According to one of the embodiments in accordance with the present invention, the microcontroller-based lighting control system comprises a lighting load, a semi-conductor switching device, a zero-crossing-point detection circuit, and the microcontroller.

The semi-conductor switching device is particularly coupled with the lighting load and AC power lines. This semi-conductor switching device is used to control and to transmit AC electric power to the lighting load. The zero-crossing-point detection circuit is coupled to the AC power lines, and converts AC voltage sine-waves into symmetric square-waves. The rising and falling edges of the symmetric square-waves correspond to the zero-crossing points of the AC voltage sine-waves. The microcontroller is coupled to the semi-conductor switching device and the zero-crossing detection circuit. The microcontroller, in the current embodiment, receives the symmetric square-waves and, in response to them, generates zero-crossing-point time-delay pulses to render the semi-conductor switching device into conduction state. In which, each zero-crossing-point time-delay pulse lags behind the rising and falling edge of the symmetric square-wave for a time interval. Thus, the zero-crossing-point time-delay pulse lags with a time interval behind the zero-crossing-point of the AC power. This delay time interval determines the conduction period of the semi-conductor switching device, and accordingly the AC electric power transmitted to the lighting load.

Furthermore, the lighting control method in accordance with the present invention is processed by a lighting control circuit in order to determine an illumination state of the lighting load. The lighting control circuit includes a semi-conductor switching device, a zero-crossing-point detection circuit, and a microcontroller. The steps in the method comprise a first step of the zero-crossing-point detection circuit converting AC voltage sine-waves into symmetric square-waves. Then the microcontroller reads an external control signal and alternately executes one of many variant external control loops written in program codes of the microcontroller in response to the external control signal. Then the corresponding zero-crossing-point time-delay pulse is generated. In particular, this zero-crossing-point time-delay pulse lags with a time interval behind the rising and falling edge of the symmetric square-wave. Further, the conduction period of the semi-conductor switching device is controlled by the corresponding zero-crossing-point time-delay pulses. Accordingly, the transmission of AC electric power to the lighting load is determined by the conduction period of the semi-conductor switching device during positive and negative half-cycle of the AC power. Further, through external control signals or internal timers, variant control loop in the microcontroller codes can be selected and executed to generate different type zero-crossing-point time-delay pulses with different delay time interval. Accordingly, a variant AC electric power transmitted to the lighting load can be achieved by executing a variant external control loop in the microcontroller program codes.

The present invention provides the advantage to implement the lighting control circuit functions by only one single microcontroller. In the conventional arts of lighting control it usually employs lots of discrete analog and digital integrated circuits. By comparison, the related circuit structure of the present invention is simple and the circuit assembly cost can be low. Particularly, the unit price of an eight-bit OTP microcontroller is acceptable in comparison with that of conventional analog and digital integrated circuits. Another advantage is the possibility to change lighting control schemes by simply modifying the microcontroller program codes without changing the main circuit structure. A further advantage of the present invention is to provide an effective power saving circuit system that is superior to the conventional analog-digital hybrid arts. Still further, it is another advantage that the present invention provides flexibility to design time-delay pulses with appropriate delay time lying behind the zero-crossing-point of AC power. This feature is essential for controlling lighting loads of different electric impedances, which may be incandescent lamps, fluorescent lamps or light-emitting diodes, without changing the circuit components on circuit board.

These and other various advantages and features of the present invention will become apparent from the following description and claims, in conjunction with the appended drawings.

DESCRIPTION OF THE PREFERRED EMBODIMENTS

Figure 1:
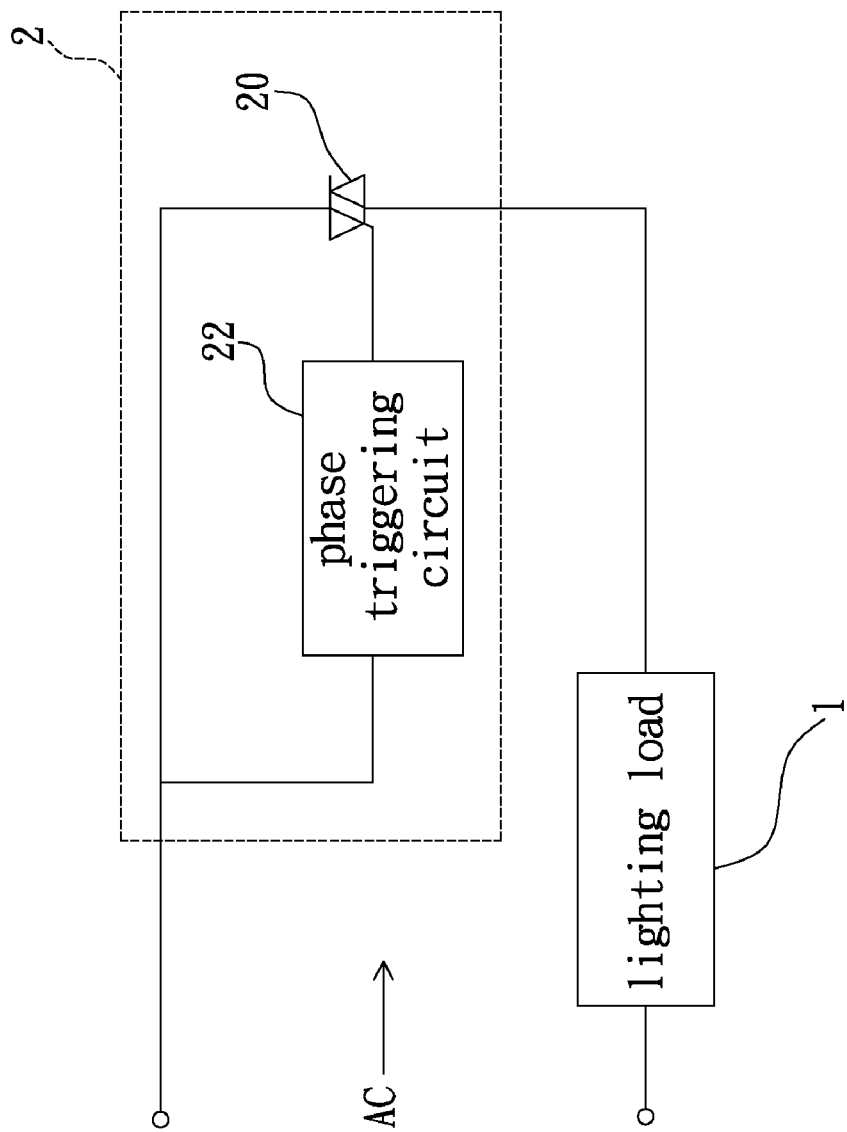
FIG. 1 schematically shows a circuit block of a conventional lighting control system.
Figure 2:
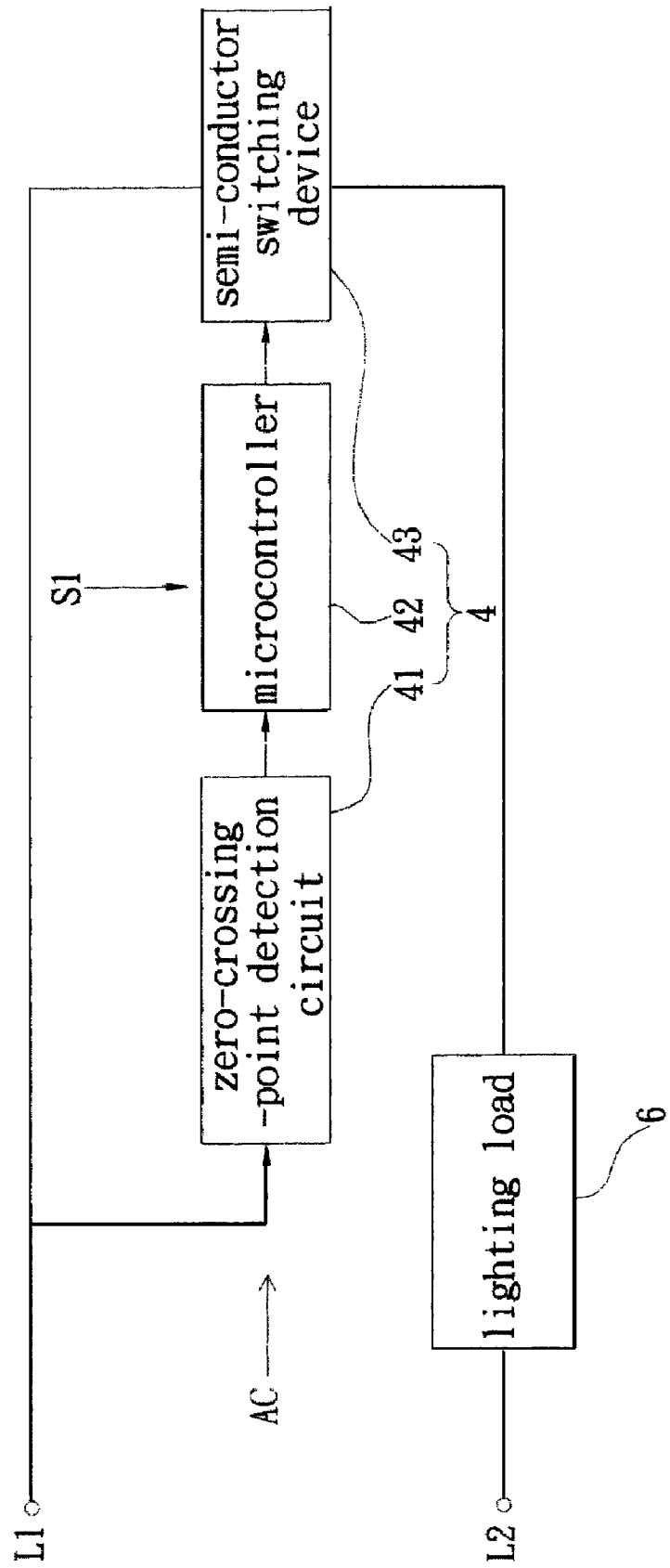
FIG. 2 shows a schematic diagram of the lighting control system in accordance with the first embodiment of the present invention.

Reference is made to FIG. 2 showing a schematic diagram of a lighting control system in accordance with the first embodiment of the present invention. The lighting control system substantially includes a zero-crossing-point detection circuit 41, a microcontroller 42, and a semi-conductor switching device 43. The components 41, 42 and 43 form a fundamental lighting control circuit 4.

Furthermore, the lighting control system is provided with an external control signal S1 which is fed by mechanical or electronic means to the microcontroller 42. Reference is made to FIG. 2. One terminal of the semi-conductor switching device 43 is connected to a wire L1 of an AC power. The other terminal of the device 43 is connected to one end of the lighting load 6, which has its other end connected to another wire L2 of the AC power. Further, the semi-conductor switching device 43 has a third terminal coupled to the microcontroller 42 for receiving trigger control signals. This type of lighting control system in accordance with the present invention is categorized into an on-line lighting control system. In the following text, the microcontroller 42 is preferably one-time programming (OTP) type. The semi-conductor switching device 43 is a bi-directional control switch, such as TRIAC.

In an aspect of power saving and circuit simplification, a one-time programming (OTP) microcontroller is preferably used in the present invention. By means of the program codes that are one-time written into the read-only memory of the microcontroller, voltage signals are generated for triggering and controlling the turn-on period of the semi-conductor switching device 43. This OTP microcontroller has the advantage of low unit device cost. Further, it is manufactured by CMOS technology. This renders it consuming very low electric power, say less than 0.1 W under normal operation condition, that is in compliance with requirements of power saving.

To be a power transmission device, the bi-directional control switch has advantage of low power consumption. It is noted that when the bi-directional control switch is turned on the voltage drop between the two terminals that are connected to the AC power and the lighting load, respectively, is nearly zero, that is at zero voltage state (ZVS). Further, when the bi-directional control switch is turned off, the current flowing through the two terminals is nearly zero, that is at zero current state (ZCS). Therefore, the whole power consumption of the bi-directional control switch is low. The power loss occurs primarily during its dynamic state changing.

Basically, during the period of positive and negative half-cycle of the AC power, selecting appropriate trigger point to bring the bi-directional control switch 43 into conduction can lead to controlling a predetermined value of the electric power transmitted to the lighting load 6. Unlike the conventional arts which use discrete operational amplifiers and digital gates, the present invention adopts a single OTP microcontroller 42 to generate zero-crossing-point time-delay pulses for triggering and controlling the turn-on period of the semi-conductor switching device 43 in order to set different brightness of the lighting load 6. The lighting load 6 can be an incandescent lamp, a fluorescent lamp, AC light emitting diode, or a module comprising DC light-emitting diodes and a full-wave bridge rectifier.

Figure 3:
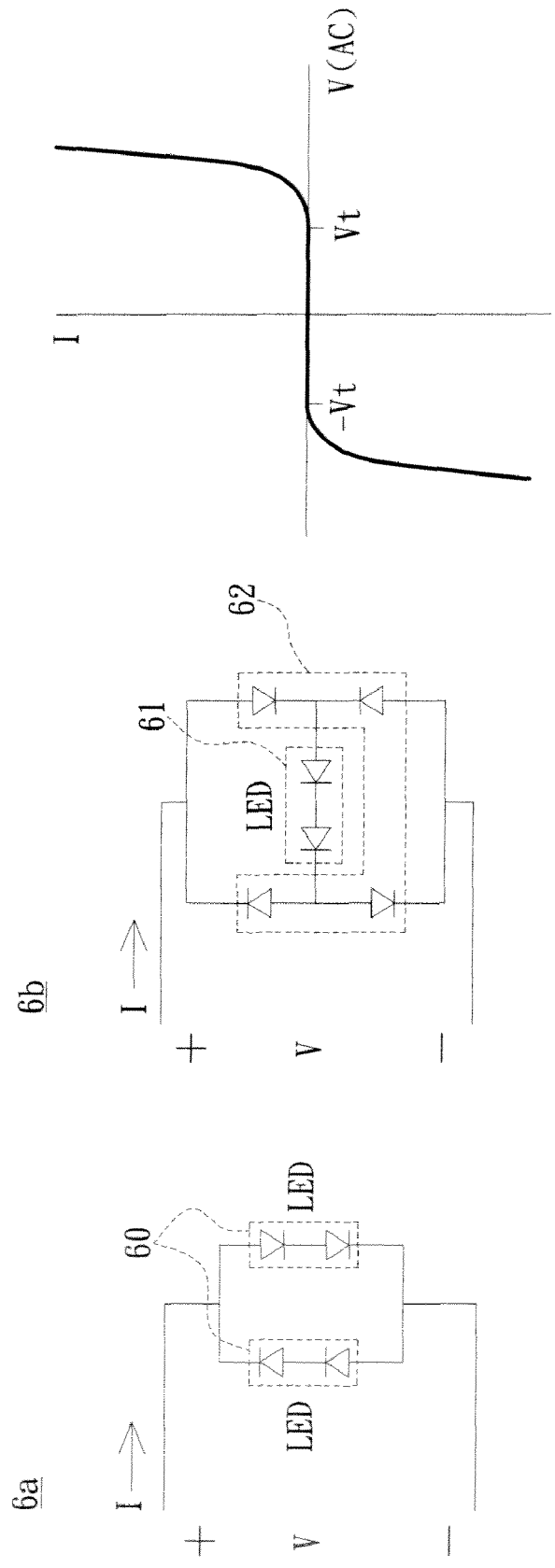
FIG. 3A shows a schematic diagram of a lighting load in accordance with the embodiment of the present invention.
FIG. 3B shows a schematic diagram of another lighting load in accordance with the embodiment of the present invention.
FIG. 3C shows a dependence of current on voltage of an AC light emitting diode module in accordance with the embodiment of the present invention.

The following describes the lighting load 6 appearing in form of AC light emitting diode. Reference is made to FIG. 2, and further in view of FIG. 3A. FIG. 3A schematically depicts a lighting load 6*a* which is a module comprising two sets of DC light emitting diodes 60 reversely parallel-connected. Further reference is made to FIG. 2 in view of FIG. 3B. FIG. 3B schematically shows another form of the lighting load 6*b* that is a module composed of a set of DC light emitting diode 61 bridging one port of a full-wave bridge rectifier 62. The light emitting diode modules depicted in both FIGS. 3A and 3B can be directly connected to AC power lines for emitting a full-power light. In this context, they are called AC light emitting diode module, or in brief, AC light emitting diode (AC-LED).

Further reference is made to FIG. 2 in view of FIG. 3C. FIG. 3C illustrates a dependence of current on voltage of an AC light emitting diode module. In the period of positive and negative half-cycle of the AC power, the AC light emitting diode module is turned on to emit light when the voltage amplitude V of the AC power exceeds a threshold value $V_t$, or cut-in voltage.

Figure 4:
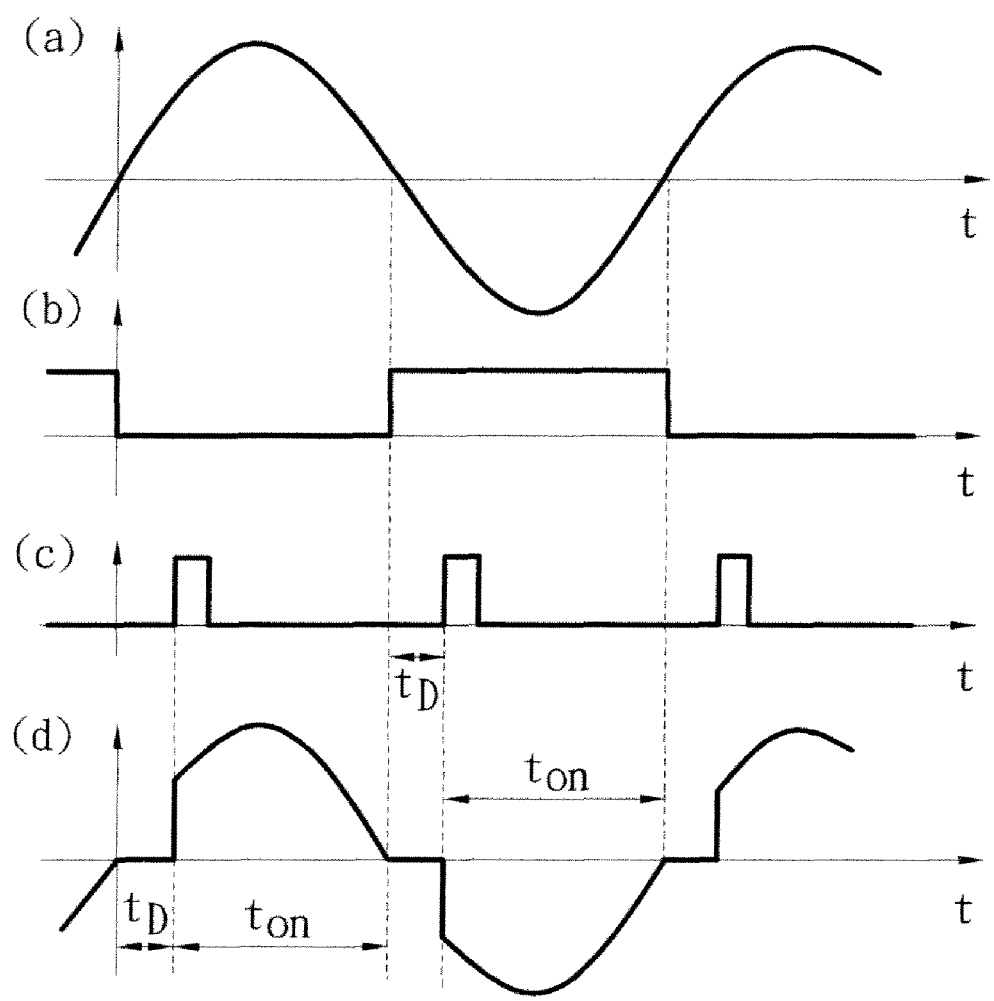
FIG. 4 shows a waveform diagram of the lighting control system in accordance with the first embodiment of the present invention.

Reference is made to FIG. 2 and further in view of FIG. 4. A waveform diagram of the first embodiment of the lighting control system of the present invention is shown in FIG. 4. In FIG. 4 it shows separately the voltage signals (a) of the AC power, (b) of the output of zero-crossing-point detection circuit 41, (c) of the zero-crossing-point time-delay pulses from the microcontroller 42 and (d) on the lighting load 6. In the following, the function principle of the lighting control system of the present invention will be described by means of the waveforms depicted in FIG. 4 (*a*)~(*d*) that are arranged in due time sequence.

The function of the zero-crossing-point detection circuit 41 is to generate voltage signal which is synchronized with the voltage waveform of the AC power. The zero-crossing-point detection circuit 41 converts the AC voltage sine-waves, FIG. 4(*a*), into symmetric square-waves with a low-level and a high-level voltage, FIG. 4(*b*). In particular, when the AC voltage sine-waves at zero-crossing points, the symmetric square-waves may rise from the low-level voltage to the high-level voltage, or descend from the high-level voltage to the low-level voltage. That is, the timing of the rising and falling edge of the symmetric square-waves coincides with the zero-crossing points of the AC voltage sine-waves.

The mentioned symmetric square-waves are fed to one pin of the microcontroller 42. This pin is in charge of detecting external interrupt signals for initiating interrupt service routine of the microcontroller 42. Furthermore, the OTP program codes of the microcontroller 42 are configured to interpret changes of the voltage level on this pin as external interrupt signals. The program codes of the microcontroller 42 comprise many variant external-signal control loops and internal-timer control loops, each of which is provided with a time-delay pulse subroutine. The microcontroller 42 executes the time-delay pulse subroutine for generating the zero-crossing-point time-delay pulses. In which, the time-delay pulse subroutine is executed when the external interrupt signals are detected by the microcontroller 42. The time point, at which an external interrupt signal is present, serves as a reference point that a zero-crossing-point time-delay pulse is generated by the time-delay pulse subroutine. Therefore, the zero-crossing-point time-delay pulse lags behind the edge of the symmetric square-wave. A timing illumination with a predetermined light intensity that lasts a certain time period is generated by the microcontroller 42 with the mentioned internal-timer control loop. It is noted that the timing illumination may extend from seconds to minutes or hours.

When the pin of the microcontroller 42 detects voltage level change at the edges of the symmetric square-waves, the microcontroller 42 executes a time-delay pulse subroutine. In which, a time-delay loop is executed according to the timing of the interrupt event. A series of zero-crossing-point time-delay pulses is thus generated that lag with a time difference $t_D$ behind the edges of the symmetric square-waves, see FIG. 4(*c*). The zero-crossing-point time-delay pulses are delivered from another control pin of the microcontroller 42, and transmitted to a gate terminal of the semi-conductor switching device 43 to trigger and turn on the device 43.

This time difference (time lag) $t_D$ is set by a time-delay loop of the time-delay pulse subroutine of the microcontroller 42. This time difference $t_D$ is set to properly control a turn-on period $t_{on}$ of the semi-conductor switching device 43. FIG. 4(*d*) shows the voltage waves between the two terminals of the lighting load 6. The light intensity of the lighting load 6 is particularly proportional to a mean AC-power transmitted from the semi-conductor switching device 43 when the switching device 43 is conductive at the period $t_{on}$ of the positive and negative half-cycle of the AC power.

In practice, the microcontroller 42 may be coupled to a mechanical push-button or a touch panel from which an external control signal S1 is generated. Further, it defines the external control signal S1 to be a zero voltage, which is preferably a temporary ground signal. When the microcontroller 42 detects an effective external control signal S1, the program codes of the microcontroller 42 proceed to execute an external control loop. According to the timing of interrupt events, the time-delay pulse subroutine is executed and the zero-crossing-point time-delay pulses in FIG. 4(*c*) are generated. Furthermore, the microcontroller 42 may enter a loop for stopping the time-delay pulses shown in FIG. 4(*c*) such that the semi-conductor switching device 43 is turned off.

Further, consideration is made to the type of lighting load 6 that imposes constraint on the transmission of electric power through the semi-conductor switching device 43. In general, both fluorescent lamp and AC light emitting diode module have a threshold voltage for turning on, namely, a cut-in voltage. The lighting load needs a voltage larger than its cut-in voltage for allowing electric current flow, as FIG. 3C illustrates. Therefore, the cut-in voltage of the lighting load 6 restricts the timing of a trigger voltage of the semi-conductor switching device 43. When the trigger voltage signal is applied on the switching device 43, the instantaneous AC voltage amplitude has to be larger than the cut-in voltage of the lighting load 6. That means that the time difference $t_D$ between the trigger pulses and the zero-crossing-points of the AC power has be to larger than a time interval corresponding to the cut-in voltage, in order to ensure that the semi-conductor switching device 43 is stably triggered and brought into conduction in the positive and negative half-cycle of the AC power.

Furthermore, the restriction can be solved by the time-delay pulse subroutine of the program codes in the microcontroller 42. Therefore, the microcontroller 42 merely needs to modify the time-delay pulse subroutine for generating the zero-crossing-point time-delay pulses with an appropriate $t_D$, without resorting to change the system circuit structure. This principle may be applicable to control the light intensity of various types of lighting load 6.

Figure 5:
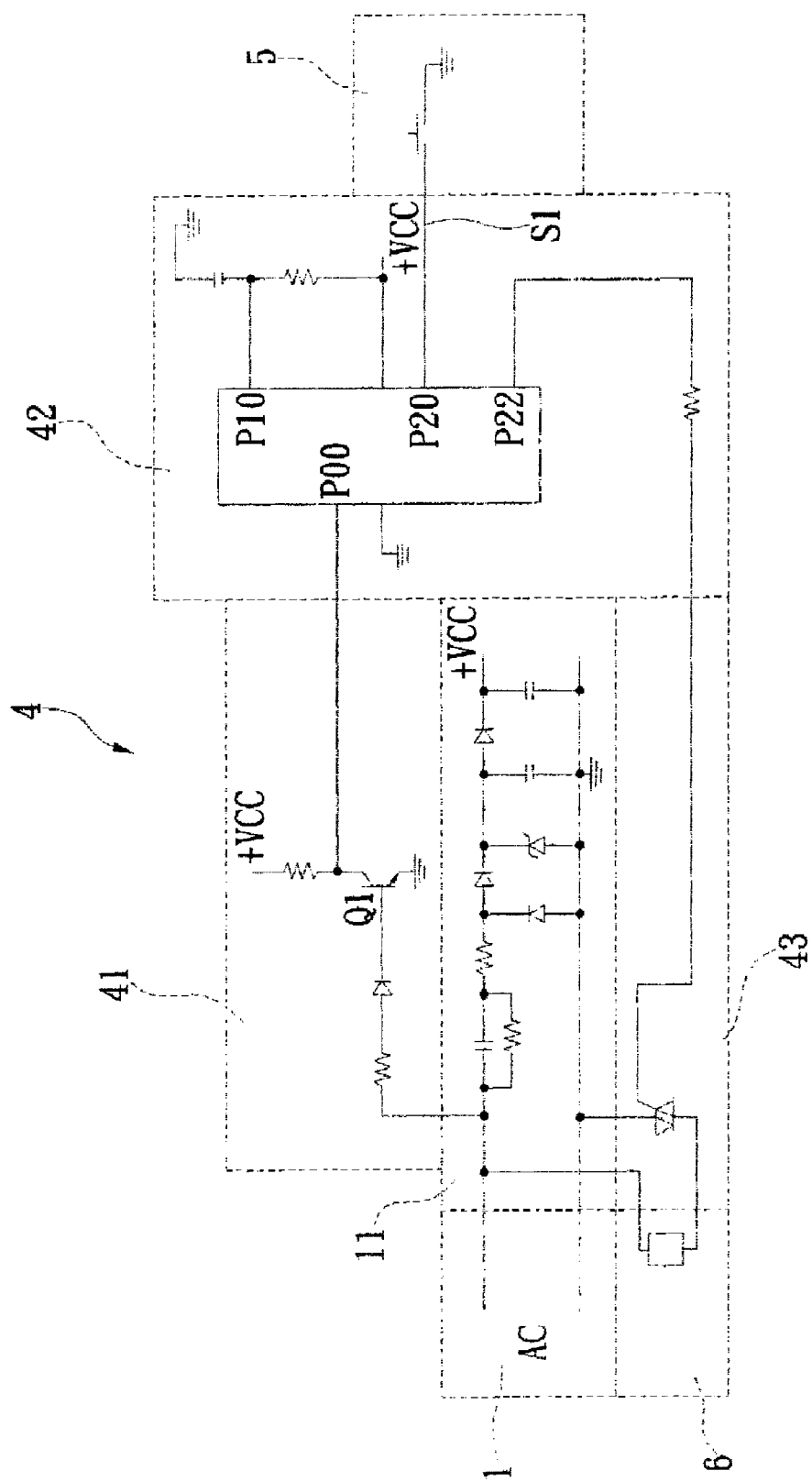
FIG. 5 shows a circuit diagram of the lighting control system in accordance with the first embodiment of the present invention.

Reference is made to FIG. 2 and in view of FIG. 5. A circuit diagram of the lighting control system in accordance with present invention is schematically shown in FIG. 5. The zero-crossing-point detection circuit 41 is an inverter circuit with transistor $Q_1$. The base of $Q_1$ is connected to a wire of the AC power via a diode and a resistor. The emitter of $Q_1$ is connected to another wire of the AC power. The collector of $Q_1$ is connected via a resistor to DC-supply $V_{CC}$, and directly to the pin P00 of the microcontroller 42. In particular, the diode at the base of $Q_1$ has a breakdown voltage exceeding 200V. This high breakdown voltage may prevent $Q_1$ from a junction breakdown. A resistor is connected in-series with the diode to limit the base current of $Q_1$.

Further reference is made to FIG. 4 and in view of FIG. 5. During the positive half-cycle of the AC power, the base of transistor $Q_1$ is at high voltage which drives the transistor $Q_1$ into deep conduction. The collector of transistor $Q_1$ is then pulled down around zero voltage. On the contrary, during the negative half-cycle of the AC power, the base of $Q_1$ is at a negative high voltage. Therefore, the transistor $Q_1$ is cut off, and the collector of $Q_1$ then rises to a DC voltage $V_{CC}$. Therefore, from the AC voltage sine-waves, the symmetric square-waves with a low-level and a high-level voltage are generated by the circuit 41, which serve as external interrupt signals applied to the pin P00 of the microcontroller 42.

Reference is made to FIG. 5. Furthermore, the microcontroller 42 has two power pins thereof connected to the DC voltage $V_{CC}$ and ground, respectively. The other pins of the microcontroller 42 are disposed as:

Pin P00 is connected to the collector of $Q_1$ of the zero-crossing-point detection circuit 41 for receiving the external interrupt signals;

Pin P10 is a reset pin, which is connected to a capacitor. As at initial powering or recovering power, the capacitor is charged to a voltage $V_{CC}$, the microcontroller 42 starts its program codes from the first address of program memory;

Pin P20 is an input pin of the external control signal S1, and connected to a mechanical push-button 5. When temporarily pushing down the mechanical push-button 5 and then releasing it, the pin P20 is shorted to ground at a short time. It resolves that one external control signal S1 appears, and the program of microcontroller 42 jumps from an original external control loop to another external control loop:

Pin P22 is connected to a gate terminal of the semi-conductor switching device 43 via a resistor for sending out the zero-crossing-point time-delay pulses in order to trigger and bring the semi-conductor switching device 43 into conduction.

The microcontroller 42 in accordance with the present invention may be flexibly and accurately designed to have pulses of different types with variant time lag $t_D$. So that, the microcontroller 42 triggers the semi-conductor switching device 43 at different timings. Therefore, the microcontroller 42 flexibly changes $t_D$ and imposes the working voltage on the lighting load 6 larger than the cut-in voltage when the lighting load 6 is a fluorescent lamp or an AC light emitting diode module. This ensures the semi-conductor switching device 43 being triggered and turned on stably during the positive and negative half-cycle of the AC power.

Reference is made to FIG. 4 and FIG. 5, and in view of FIG. 3C. Assume the AC power have voltage amplitude $V_m$ and frequency f. Since the lighting load having a cut-in voltage $V_t$, the time lag $t_D$ of the zero-crossing-point time-delay pulses delivered from the pin P22 of the microcontroller 42 has to be restricted to $t_o < t_D < 1/(2f) - t_o$, wherein $t_o = (1/2\pi f)\sin^{-1}(V_t/V_m)$. This relationship is adapted to every type of the lighting load 6, in which the semi-conductor switching device 43 can be stably triggered and turned on during the positive and negative half-cycle of the AC power.

In an example of the AC light emitting diode module with $V_t(rms)=80V$, $V_m(rms)=110V$ and f=60 Hz, it has $t_o=2.2$ ms and $1/(2f)=8.3$ ms. The time lag $t_D$ of zero-crossing-point time-delay pulses generated from the microcontroller 42 has to be within the range 2.2 ms $< t_D < 6.1$ ms.

Reference is made to FIG. 5. A circuit 4 performs a method of lighting control. The method is to define an illumination state of the lighting load 6. The method includes a first step of using the zero-crossing-point detection circuit 41 to convert AC voltage sine-waves into symmetric square-waves. The microcontroller 42 then reads an external-control signal S1, and accordingly selects and executes one of the variant external control loops alternately. The corresponding zero-crossing-point time-delay pulses are then generated. The zero-crossing-point time-delay pulse lags with a time interval $t_D$ behind the rising and descending edge of the symmetric square-waves in the positive and negative half-cycle of the AC power.

The conduction state of the semi-conductor switching device 43 is controlled by a corresponding zero-crossing-point time-delay pulse for controlling the AC power transmitted to the lighting load 6. The program codes in the microcontroller 42 jump in response to an external control signal S1 from an external control loop to another external control loop, each generates zero-crossing-point time-delay pulses of corresponding loop with a specific time lag $t_D$. In addition, the lighting control scheme may be further modified in such a way that a gradually-changing time delay loop in the time-delay pulse subroutine is further executed for the lighting load 6 to render an effect of fade-out or fade-in lighting.

Figure 6:
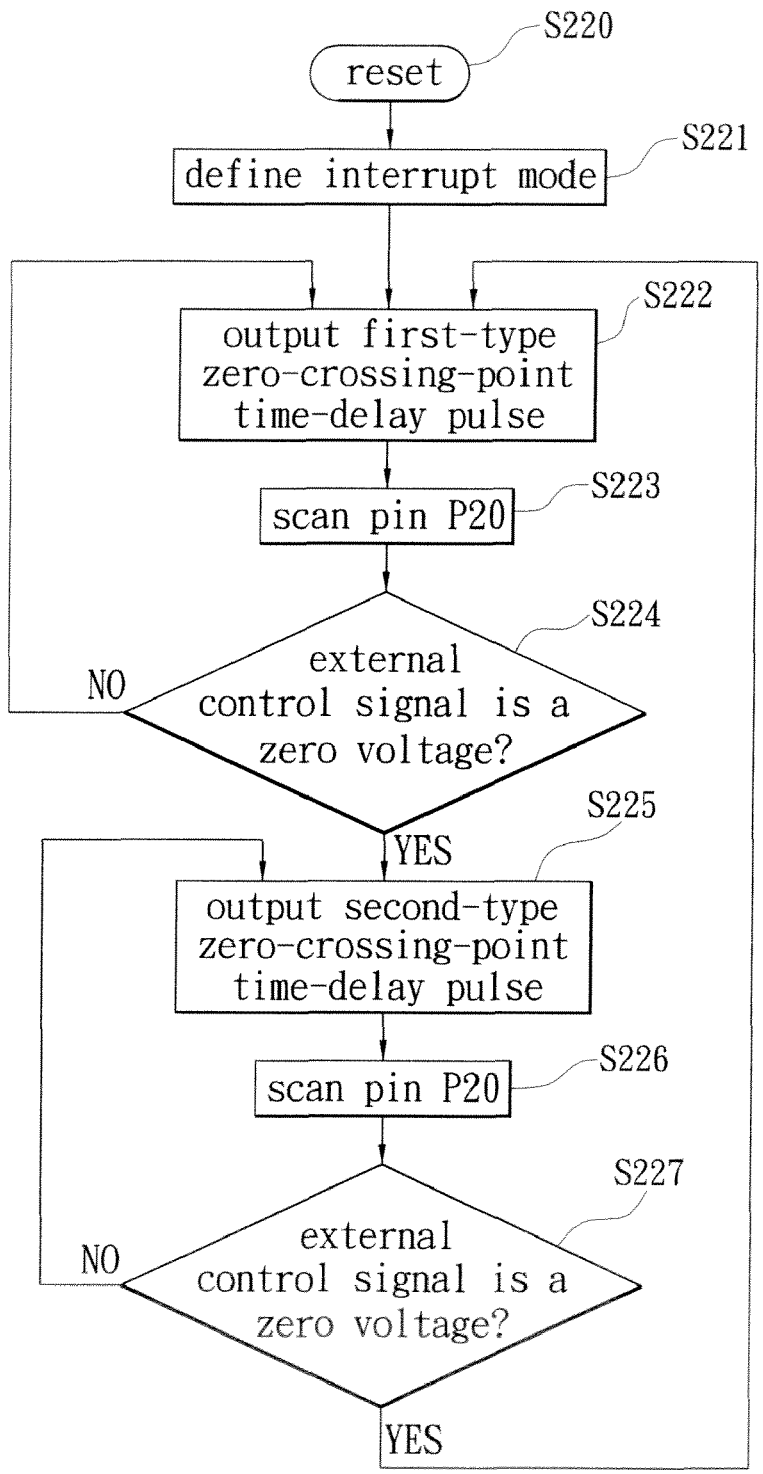
FIG. 6 illustrates a flow chart of the microcontroller program codes in accordance with the first embodiment of the present invention.

FIG. 6 shows a flow chart of executing program codes of the microcontroller in accordance with the present invention. A written-in program of the OTP microcontroller 42 is configured to have two variant external control loops in order to generate zero-crossing-point time-delay pulses with two different time lags $t_D$. When the pin P20 of the microcontroller 42 detects an external control signal S1, the microcontroller 42 then executes one of the two external control loops. In steps from S222 to S224, a first external control loop is executed by the microcontroller; and in steps from S225 to S227 a second external control loop is executed.

Reference is made to FIG. 6 and further in view of FIG. 5. The flow chart shows the program codes start from step S220 to reset the microcontroller 42 as the reset pin P10 senses the working voltage $V_{CC}$. By reset, the microcontroller executes the program codes from the first address in microcontroller memory. Next, step S221 defines interrupt mode for the microcontroller 42, in which the change of the voltage level sensed by the pin P00 is considered as interrupt signals. Then the program codes of the microcontroller 42 proceed to an external control loop comprising steps S222 through S224. In step S222, zero-crossing-point time-delay pulses of first-type are delivered from the pin P22 of the microcontroller 42. In step S223, the codes of the microcontroller 42 scan the pin P20 and check whether an external control signal S1 is present. In step S224, decision is made if the pin P20 is at a high voltage (P20=1, bit "1" for high voltage), the pin P22 continuously delivers the first-type zero-crossing-point time-delay pulses; if the pin P20 is at a zero voltage (P20=0, bit "0" for zero voltage), the program codes jump to a second external control loop comprising steps S225 through S227. In step S225, zero-crossing-point time-delay pulses of second-type are delivered from the pin P22 of the microcontroller 42. In step S226, the codes of microcontroller 42 scan the pin P20 and again check whether an external control signal S1 is present. In step S227, decision is made if P20=1, the pin P22 continuously delivers the second-type zero-crossing-point time-delay pulses; if P20=0, the program codes of the microcontroller 42 jump back to the first external control loop, and the pin P22 delivers the first-type zero-crossing-point time-delay pulses.

Figure 7:
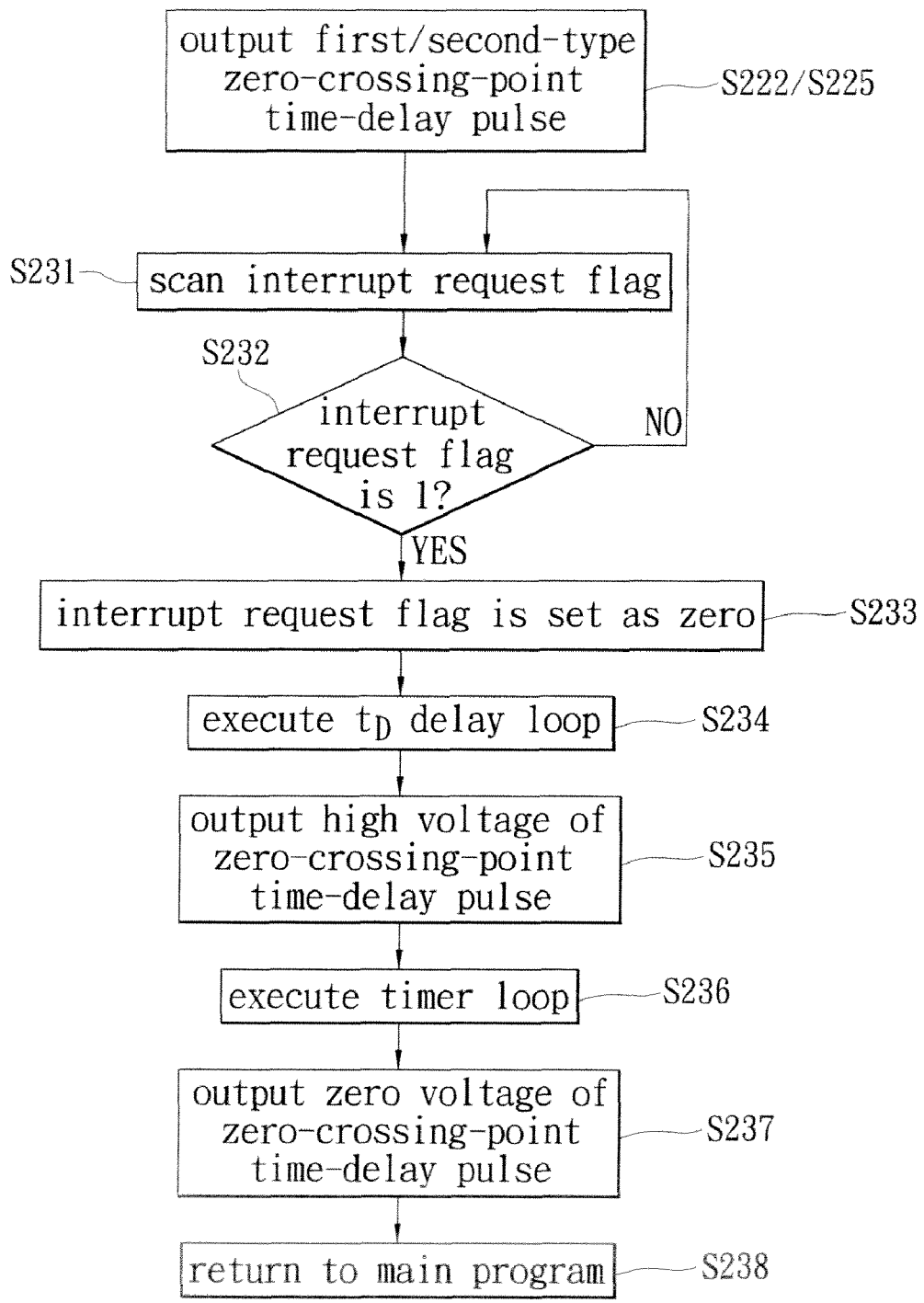
FIG. 7 shows a flow chart of the time-delay pulse subroutine in accordance with the first embodiment of the present invention.

Reference is made to FIG. 7, in view of FIG. 5 and FIG. 6. FIG. 7 is a flow chart to illustrate a time-delay pulse subroutine within the steps S222 and S225, for generating the aforementioned first- and second-type zero-crossing-point time-delay pulses, respectively, in accordance with the first embodiment of the present invention. The steps S231 through S238 are arranged to generate the zero-crossing-point time-delay pulses during the positive and negative half-cycle of AC power. Further, the pulses are delivered from the pin P22 for triggering and turning on the semi-conductor switching device 43. The scheme of this time-delay pulse generation is based on one property of microcontroller, that is, an interrupt request flag of the microcontroller is automatically set to a high voltage bit, or bit "1", when an external interrupt signal is detected. Therefore, by checking the bit content of this interrupt request flag during the execution of the program codes, the time point that interrupt event occurs can be found out. The timing of the interrupt event is used as a time reference, and accordingly a sequence of time-delay pulses corresponding to the zero-crossing points of the AC power is generated.

As shown in FIG. 7. the time-delay pulse subroutine begins from step S231 to scan the interrupt request flag. In step S232, if the bit of the interrupt request flag is "0", it means no interrupt event occurring, and continues the scan; if the bit is "1", an interrupt event occurs, and the program codes jump out the scan loop and proceed to the step S233. At this moment, it is actual the time point equal to the zero-crossing point of the AC power according to this design scheme. In step S233, the interrupt request flag is set back to zero for waiting until next interrupt event.

In step S234, the program codes proceed to execute a time delay loop for generating the time difference $t_D$. For the first-type zero-crossing-point time-delay pulses, the related time length of the loop is $t_{D1}$; for the second-type zero-crossing-point time-delay pulses, the length is $t_{D2}$. Through the steps of S235 to S237, a zero-crossing-point time-delay pulse with pulse width $t_p$ is generated. In step S235, after a time interval $t_D$, the pin P22 is set to a high voltage (P22=1, here the high voltage is $V_{CC}$). In step S236, a timer loop with short length $t_p$ is executed. In step S237, the voltage at the pin P22 is set to zero voltage (P22=0). As a consequence, a pulse with height $V_{CC}$, and width $t_p$ appears at the pin P22. Further in step S238, the program codes jump out the subroutine and return to the main program. It proceeds to the steps S223 or S226.

In the embodiment, the mentioned first- and second-type zero-crossing-point time-delay pulses are generated in step S222 and step S225, and the pulses have the same pulse width $t_p$, which is ranged within 0.2 ms and 0.5 ms. The time lag $t_D$ of the time-delay pulses of the two types are in general configured to be $t_{D1} > t_{D2}$. Reference is made to FIG. 4, for $t_{D1} > t_{D2}$, the first-type zero-crossing-point time-delay pulses render a low brightness of the lighting load 6 due to a long delay time $t_{D1}$ or a short AC power transmission time interval $t_{on}$, and the second-type pulses render a high brightness due to a short delay time $t_{D2}$ or a long AC power transmission time interval $t_{on}$.

Figure 8:
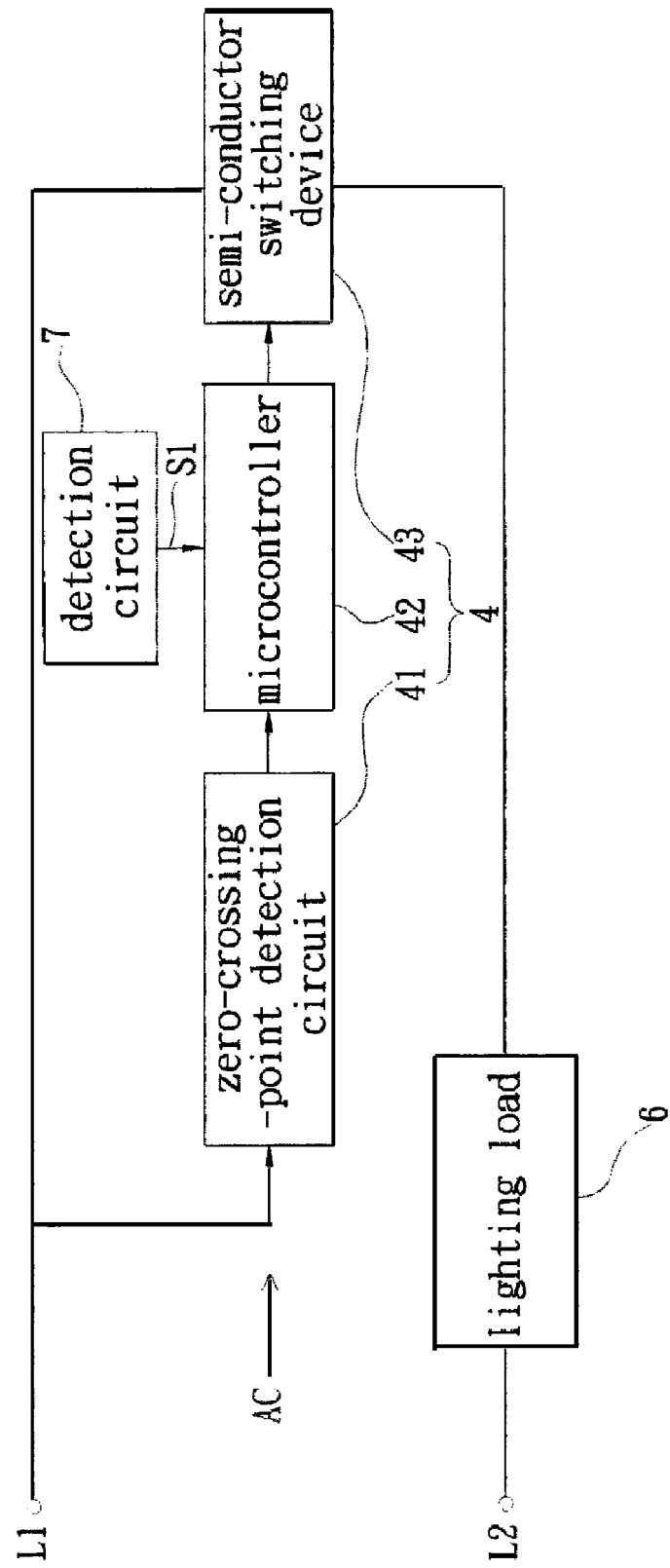
FIG. 8 schematically shows a lighting control system in accordance with the second embodiment of the present invention.

Reference is made to FIG. 8, which shows a schematic diagram of the lighting control system in accordance with second embodiment. It adopts an electronic means to transmit the external control signal S1 to the microcontroller 42 for selecting an external control loop. The program codes of the microcontroller 42 then executes a time-delay pulse subroutine according to a scheme of FIG. 7. After that, the zero-crossing-point time-delay pulses with different time lags $t_D$ are generated and used for controlling the turn-on period of the semi-conductor switching device 43. In FIG. 8, the microcontroller 42 is coupled to an output terminal of the detection circuit 7. This detection circuit 7 can be a motion detection circuit, a daylight detection circuit, or a sound detection circuit, or any one of their combinations.

Similar to the aforementioned mechanical means, it is appropriately to set an effective external control signal S1 as zero voltage that may be a temporary ground signal. The detection circuit 7 can be a motion detection circuit, and by which a zero voltage is generated if any human motion is detected. When the external control signal S1 is a zero voltage, the program codes of the microcontroller 42 proceed to a selected external control loop in which the zero-crossing-point time-delay pulses of $t_D$ are generated. Therefore, the light intensity of the lighting load 6 can be automatically switched to an appropriate brightness level according to the environmental background. This enables the lighting control system in accordance with second embodiment to work at power saving mode and to manipulate under a monitor mode.

Figure 9:
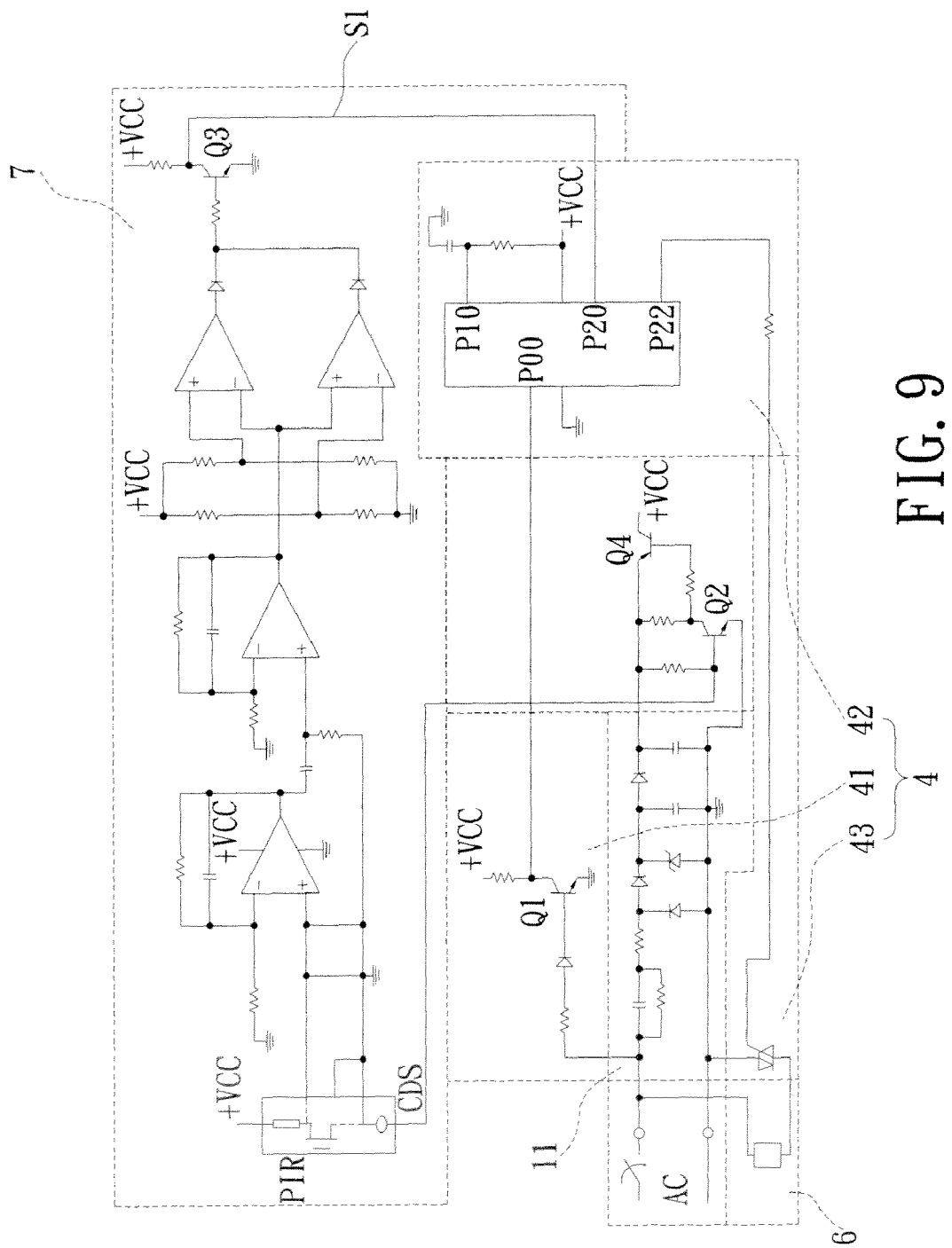
FIG. 9 shows a circuit diagram of the lighting control system in accordance with the second embodiment of the present invention.

Reference is made to FIG. 9 and in view of FIG. 8. FIG. 9 shows a circuit diagram of the lighting control system in accordance with the second embodiment. In comparison with the lighting control circuit 4 shown in FIG. 5, the microcontroller 42 shown in FIG. 9 receives external control signal S1 from an electronic circuit 7 that is unlike a mechanical push-button 5 in FIG. 5. In FIG. 9, the pin P20 of microcontroller 42 is connected to the collector of transistor $Q_3$ of a detection circuit 7. The detection circuit 7, that is a conventional one, is preferably a motion detection circuit comprising an infrared sensing element PIR and a set of amplifiers. As any human motion is detected, the transistor $Q_3$ is turned on and driven into saturation. The collector of $Q_3$, as well as the pin P20 of microcontroller 42, is then pulled down to near ground potential. That means an effective external control signal S1 is present at the pin P20.

The program codes of the microcontroller 42 scan the pin P20. As soon as an effective external control signal S1 is detected, the program codes jump from an original external control loop to another external control loop. When a predetermined time period elapses, the program codes jump back to the original external control loop. Thus, the microcontroller 42 alternately executes a first illumination mode and a second illumination mode in response to the external control signal S1. In a preferable example, the first illumination mode is set as a low light intensity mode, and the second illumination mode is set as a high light intensity mode. The microcontroller 42 conducts normally a low brightness mode, and switches to a timing high brightness mode in response to external control signal S1 from a motion detection circuit. After a predetermined time is up, it returns to the low brightness mode.

Figure 10:
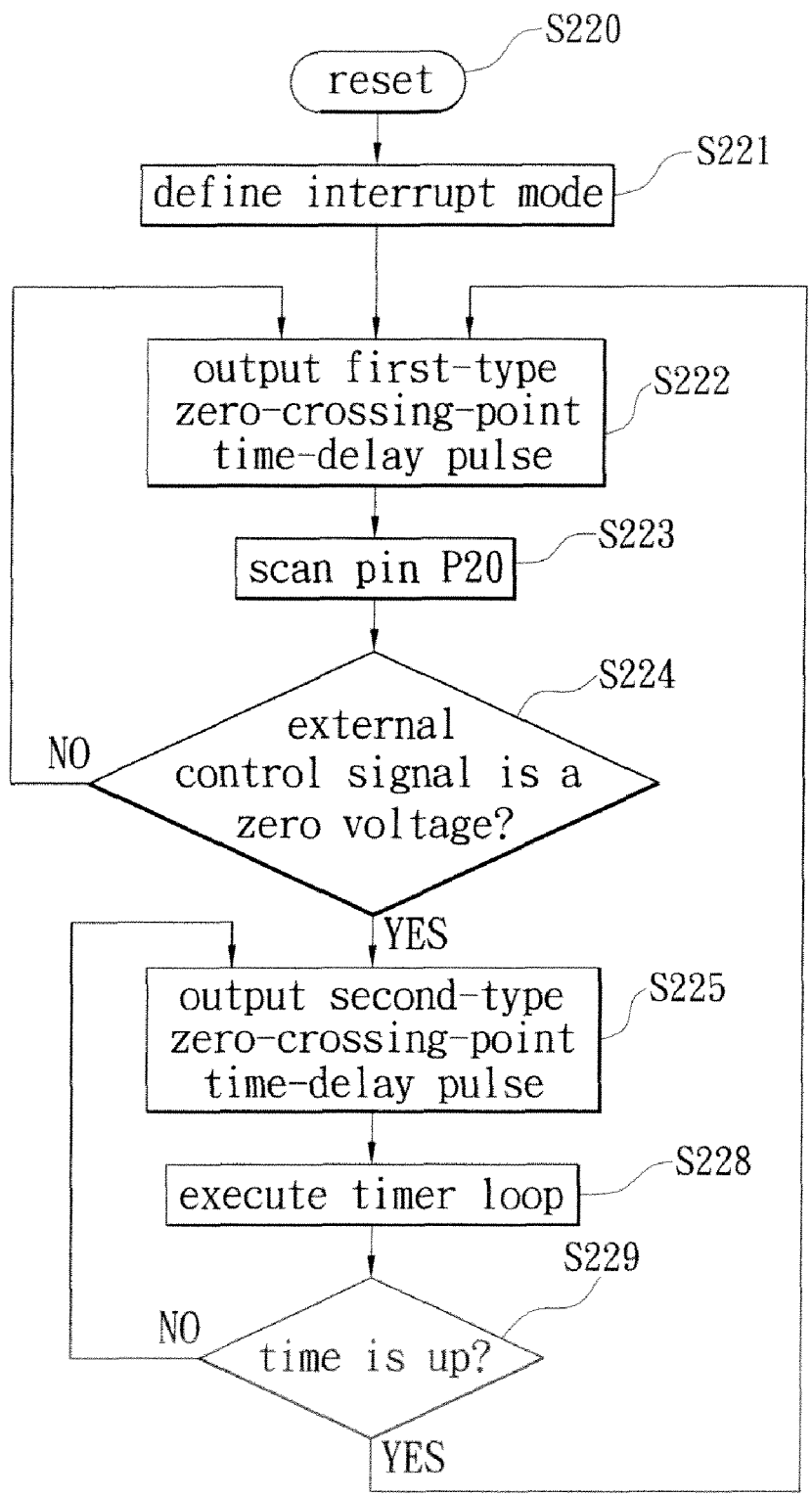
FIG. 10 illustrates a flow chart of the microcontroller program codes in accordance with the second embodiment of the present invention.

Reference is made to FIG. 10, and in view of FIG. 9. FIG. 10 shows a flow chart of the microcontroller program codes in accordance with the second embodiment. FIG. 10 has a first external control loop comprising steps S222 through S224 that, with step S223, responds to the external control signal S1 from the motion detection circuit 7. Comparing with FIG. 6, the flow chart in FIG. 10 is featured with a second external control loop not responding to external control signal S1. In which, a timer loop S228, instead of step S226 in FIG. 6, is executed. Step 229 checks the timer. If the timer is not yet up, the second-type zero-crossing-point time-delay pulses are continuously generated via the pin P22; if it is up, the program codes proceed to the first external control loop for generating the first-type zero-crossing-point time-delay pulses via the pin P22.

Figure 11:
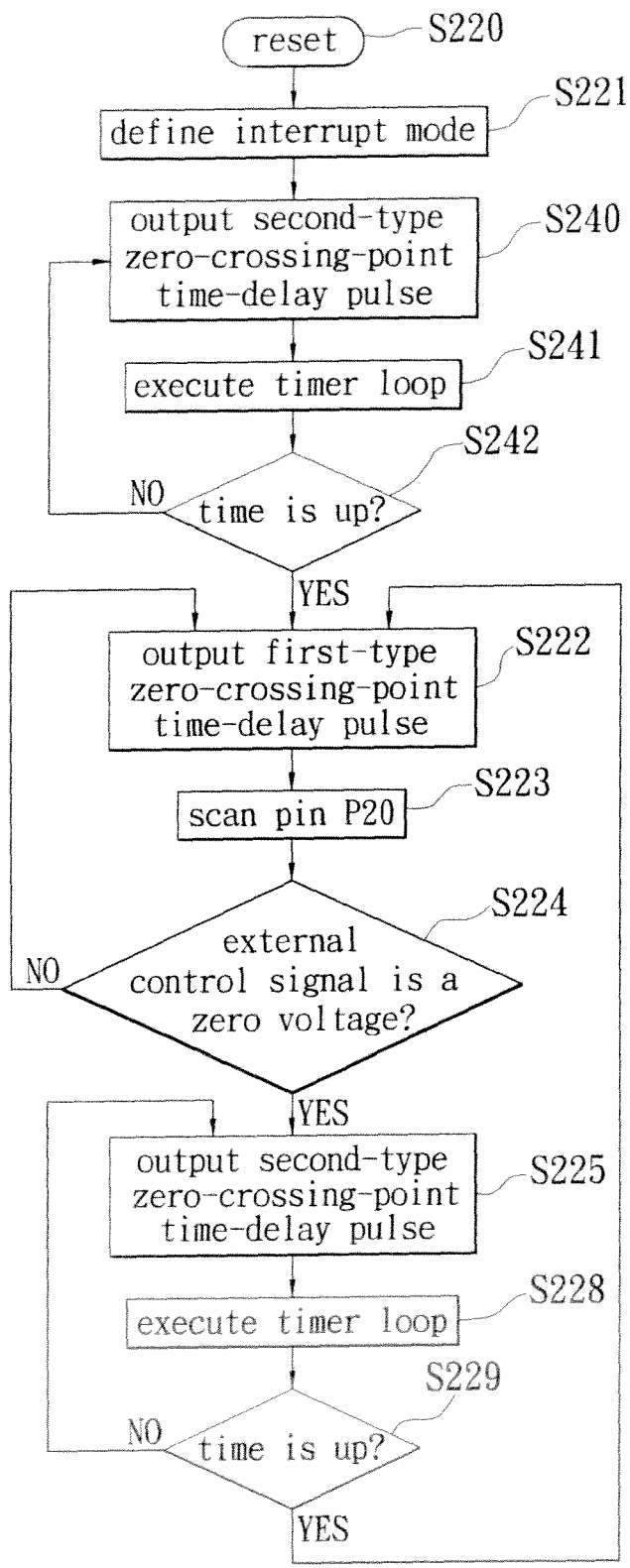
FIG. 11 illustrates a flow chart of another microcontroller program codes in accordance with the second embodiment of the present invention.

Further reference is made to FIG. 11, and in view of FIG. 9. The flow chart in FIG. 11 illustrates the operation of an alternative type of the microcontroller program codes. One objective of this embodiment is to implement a long-time illumination and in combination with the motion detection and timing illumination. Comparing with the flow chart in FIG. 10, it is featured with a delay timer loop comprising steps S240 through S242 that are inserted between the step S221 and the step S222. It is noted that the second-type of zero-crossing-point time-delay pulses of high brightness mode is generated via the pin P22 of the microcontroller 42 in step S240. Further, step S241 represents the process executing a timer loop with long time length (that may be hours). If the time is not yet up, the control loop of steps S240 through S242 continuously sends out the second-type zero-crossing-point time-delay pulses via the pin P22; if the time is up, the program codes proceed to step S222 and start up a mode involving motion detection circuit.

It is further noted that the steps S222 to S229 in FIG. 11 are similar with the description of the steps in FIG. 10. By means of microcontroller 42, the lighting load 6 is automatically switched from the low-brightness mode to a timing high-brightness mode and back to low-brightness or power-saving mode within a predetermined time.

In FIG. 11, the microcontroller 42 particularly receives a first external control signal from a daylight detection circuit, and a second external control signal from a motion detection circuit. Meanwhile, the microcontroller 42 then executes a first illumination mode according to the received first external control signal, such as the previously mentioned step S240. Next, the control mode of the motion detection circuit is introduced, and the microcontroller 42 alternately executes a second illumination mode and a third illumination mode according to the second external control signal. In which, the second illumination mode is preferably set as a low-brightness mode, and the third illumination mode is for high-brightness mode.

Figure 12:
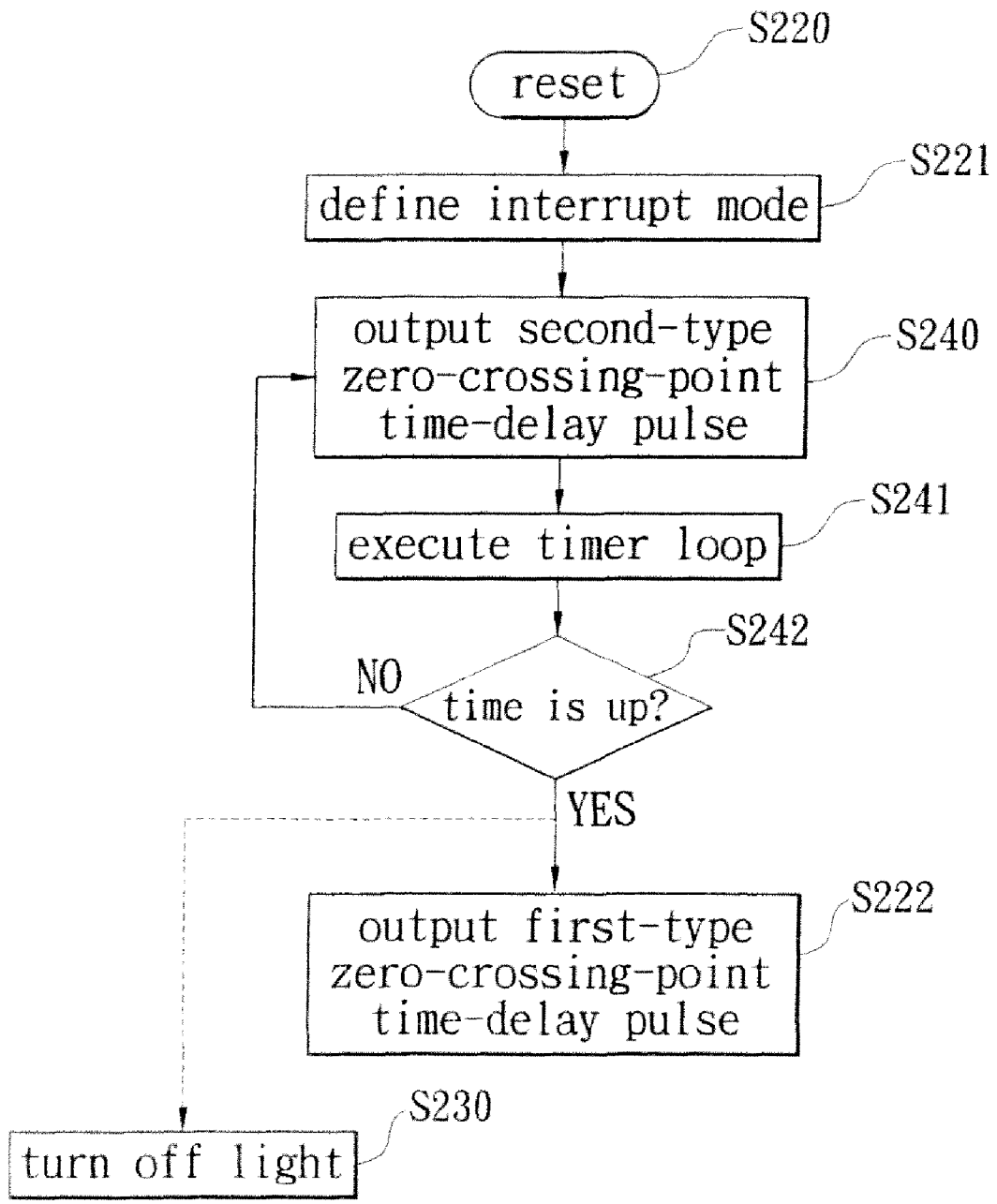
FIG. 12 illustrates a flow chart of a further microcontroller program codes in accordance with the second embodiment of the present invention.

FIG. 12 illustrates a flow chart of the microcontroller in accordance with second embodiment executing a further possible type of program codes. It is noted that the steps S221 to S242 in FIG. 12 is similar with the steps illustrated in FIG. 11. When any human motion is detected, the lighting load 6 displays a timing high-brightness mode for a while. The process may switch to the low-brightness mode (step S222) for power-saving purpose or turn off light (step S230) as the time ends.

Reference is made to FIG. 9. The detection circuit 7 is further in association with a daylight detection circuit. It controls supply of system working voltage $V_{CC}$ for power saving purpose. In FIG. 9 a conventional daylight detection circuit is shown that comprises a photosensitive resistor, or a CDS element, and two bipolar junction transistors $Q_2$ and $Q_4$. As shown in FIG. 9, $Q_2$ has its base connected to the CDS element and via a resistor connected to the high end of a DC power source 11. Further, $Q_4$ has its emitter connected to the high end of the DC power source 11 and its base via a resistor connected to the collector of $Q_2$.

In particular, the CDS element shows a low resistance when it is exposed to daylight or high light intensity. Therefore, under daylight, the base of $Q_2$ is pulled to a low potential. Then, $Q_2$ is cutoff. The emitter and base of $Q_4$ are at the same high potential. Then, $Q_4$ is cutoff also. The cutoff of $Q_4$ prohibits the supply of $V_{CC}$ to the microcontroller 42. The whole lighting control system stops work. No AC electric power is transmitted to the lighting load 6. At dark, on the contrary, the CDS element shows a high-resistance. Both $Q_2$ and $Q_4$ are turned on, and the DC power source 11 supplies $V_{CC}$ via $Q_4$ to the microcontroller 42. The system works.

To sum up the above descriptions, the lighting control system in accordance with the present invention adopts a microcontroller to generate time-delay pulses that are synchronized with the AC power. The time-delay pulses control conduction period of a semi-conductor switching device for transmitting AC power to a lighting load. The system and method thereof disclosed in the present invention enable the lighting load performing two-level or multi-level illumination in a simple and power saving manner. While the conventional circuits use cumbersome passive resistor-capacitor scheme to generate required timing control, this lighting control system use simple scheme based on a built-in oscillator in the microcontroller. This scheme provides high flexibility and accuracy to implement delay-time triggering.

The ability of providing accurate delay-time triggering makes the lighting control system of the present invention easily adapted to on-line controlling the light intensity of AC light emitting diodes. Further, this lighting control system may also apply to on-line controlling DC light-emitting diodes. In particular, the DC light-emitting diodes are disposed in an electric full-wave rectifier to avoid complicated off-line light dimming circuits.

The lighting control system disclosed in the present invention probably has many possible embodiments. Besides manual generation, the external control signal for the microcontroller may come from a motion sensing circuit or other types of sensing elements. Furthermore, a desired light dimming may be implemented through program codes of microcontroller rather than by complicated circuit structures or changing components on the circuit board.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. A lighting control system using with a microcontroller, comprising:
    a lighting load;
    a semi-conductor switching device coupled to the lighting load and an AC power,
        wherein the semi-conductor switching device controls a time period for the AC power transmitting an electric power to the lighting load;
    a zero-crossing-point detection circuit coupled to the AC power, wherein the zero-crossing-point detection circuit converts AC voltage sine-waves into symmetric square-waves, and an edge of the symmetric square-wave corresponds to a zero-crossing point of the AC voltage sine-wave; and
    a microcontroller coupled to the semi-conductor switching device and the zero-crossing-point detection circuit, wherein the microcontroller receives the symmetric square-wave and sends out a zero-crossing-point time-delay pulse to the semi-conductor switching device, and the zero-crossing-point time-delay pulse lags with a time difference behind the edge of the symmetric square-wave, wherein the said time difference ranges from ($t_o$) to ($1/(2f)-t_o$), wherein $t_o=(1/2\pi f)\sin^{-1}(V_t/V_m)$, f is frequency of the AC power, $V_m$ is voltage amplitude of the AC and $V_t$ is threshold voltage for the electric current flowing in the lighting load.

2. The system of claim 1, wherein the microcontroller further couples to a mechanical push-button or a touch panel, wherein the mechanical push-button or the touch panel is used to send an external control signal to the microcontroller, and the external control signal is a temporary ground signal.

3. The system of claim 1, wherein the microcontroller further couples to a detection circuit, which is used to send an external control signal to the microcontroller as a control mean for switching an illumination mode.

4. The system of claim 3, wherein the detection circuit is implemented by a sound detection circuit, a light detection circuit, or a motion detection circuit.

5. The system of claim 1, wherein the microcontroller is a type of one-time programming microcontroller.

6. The system of claim 1, wherein the lighting load is an AC light emitting diode module, an incandescent lamp, or a fluorescent lamp.

7. The system of claim 1, wherein the lighting load includes a DC light-emitting diode module bridging one port of a full-wave bridge rectifier.

8. The system of claim 1, wherein the semi-conductor switching component is a bi-directional control switch.

9. A method of lighting control, providing a lighting control circuit for determining a lighting status of a lighting load, wherein the lighting control circuit includes a semi-conductor switching device, a zero-crossing-point detection circuit, and a microcontroller, the method comprising:
the zero-crossing-point detection circuit converting AC voltage sine-waves to symmetric square-waves;
the microcontroller reading an external control signal, and executing one of a plurality of different external control loops according to the external control signal, and generating a corresponding series of zero-crossing-point time-delay pulses, wherein the zero-crossing-point time-delay pulse lags behind the edge of the symmetric square-wave for a time difference, wherein the said time difference ranges from ($t_o$) to ($1/(2f)-t_o$), wherein $t_o=(1/2\pi f)\sin^{-1}(V_t/V_m)$, f is frequency of the AC power, is voltage amplitude of the AC power, and V, is threshold voltage for the electric current flowing in the lighting load; and
controlling the time period for an AC power transmitting electric power to the lighting load by means of the semi-conductor switching device controlled by the corresponding zero-crossing-point time-delay pulse.

10. The method of claim 9, wherein the one external control loop comprises a time-delay pulse subroutine and the microcontroller executes the time-delay pulse subroutine for generating the zero-crossing-point time-delay pulse.

11. The method of claim 10, wherein the zero-crossing-point time-delay pulse subroutine uses a variation of bit content in an interrupt request flag of the microcontroller to measure a timing of an interrupt event, and the timing is at the edge of the symmetric square-wave.

12. The method of claim 11, wherein the time-delay pulse subroutine further comprises a delay loop and the zero-crossing-point time-delay pulse is generated at a time period measured from the edge of the symmetric square-wave as the microcontroller executes the delay loop.

13. The method of claim 9, wherein the microcontroller further comprises a timer loop, and the microcontroller executes one of a plurality of variant external control loops in response to the external control signal and the timer loop, so as to generate corresponding types of zero-crossing-point time-delay pulses, wherein the different types of zero-crossing-point time-delay pulses lag with different time intervals behind the edges of the symmetric square-waves.

14. The method of claim 13, wherein the microcontroller further comprises a long-delay timer loop, and the microcontroller executes in response to the external control signal one of the plurality of external control loops, the timer loop, and the long-delay timer loop, so as to generate corresponding types of zero-crossing-point time-delay pulses, wherein the different types of zero-crossing-point time-delay pulses lag with different time intervals behind the edges of the symmetric square-waves.

15. The method of claim 14, wherein the microcontroller further comprises a gradually-changing time delay loop in the time-delay pulse subroutine, wherein the microcontroller executes the gradually-changing time delay loop, during the execution of the two variant external control loops.

16. The method of claim 9, wherein the microcontroller alternately executes the variant external control loops in response to the external control signal, so as to alternately execute a first illumination mode and a second illumination mode.

17. The method of claim 16, wherein the external control signal is generated by a daylight detection circuit.

18. The method of claim 9, wherein the external control signal is a first external control signal or a second external control signal, and the microcontroller executes the variant external control loops in response to the first external control signal, so as to execute a first illumination mode; and the microcontroller alternately executes the variant external control loops in response to the second external control signal, so as to alternately execute a second illumination mode and a third illumination mode.

19. The method of claim 18, wherein the first external control signal is generated by a daylight detection circuit and the second external control signal is generated by a motion detection circuit.

* * * * *

UNITED STATES PATENT AND TRADEMARK OFFICE
CERTIFICATE OF CORRECTION

PATENT NO. : 8,310,163 B2  Page 1 of 1
APPLICATION NO. : 12/861940
DATED : November 13, 2012
INVENTOR(S) : Chia-Teh Chen It is certified that error appears in the above-identified patent and that said Letters Patent is hereby corrected as shown below:

In the Claims

At claim 1, column 13, lines 2-4: please delete "f is frequency of the AC power, Vm is voltage amplitude of the AC and Vt is threshold voltage for the electric current flowing in the lighting load." and add:
--f is frequency of the AC power, Vm is voltage amplitude of the AC power, and Vt is threshold voltage for the electric current flowing in the lighting load.--

At claim 9, column 13, lines 42-45: please delete "f is frequency of the AC power, is voltage amplitude of the AC power, and V, is threshold voltage for the electric current flowing in the lighting load" and add:
--f is frequency of the AC power, Vm is voltage amplitude of the AC power, and Vt is threshold voltage for the electric current flowing in the lighting load.--

Signed and Sealed this
Twenty-fifth Day of August, 2015

Michelle K. Lee
*Director of the United States Patent and Trademark Office*